United States Patent
Ozaki

(10) Patent No.: US 8,542,371 B2
(45) Date of Patent: Sep. 24, 2013

(54) INFORMATION PROCESSING METHOD AND INFORMATION PROCESSING APPARATUS

(75) Inventor: Hiroshi Ozaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 332 days.

(21) Appl. No.: 12/696,548

(22) Filed: Jan. 29, 2010

(65) Prior Publication Data

US 2010/0208284 A1  Aug. 19, 2010

(30) Foreign Application Priority Data

Feb. 18, 2009 (JP) ................. 2009-035817

(51) Int. Cl.
*G06F 3/12* (2006.01)
*G06F 3/048* (2013.01)

(52) U.S. Cl.
USPC .......... 358/1.13; 358/1.1; 358/1.15; 715/764; 715/810

(58) Field of Classification Search
None
See application file for complete search history.

(56) References Cited

U.S. PATENT DOCUMENTS

| | | | |
|---|---|---|---|
| 7,057,747 B1 | 6/2006 | Minagawa | 358/1.13 |
| 7,383,554 B2 | 6/2008 | Ozaki et al. | |
| 2004/0250264 A1* | 12/2004 | Kato | 719/321 |
| 2006/0031766 A1* | 2/2006 | Minagawa | 715/705 |
| 2008/0222181 A1* | 9/2008 | Yoshioka | 707/101 |
| 2009/0296126 A1* | 12/2009 | Jang | 358/1.13 |
| 2010/0299633 A1* | 11/2010 | Minagawa | 715/810 |

FOREIGN PATENT DOCUMENTS

JP  2000-222159  8/2000

* cited by examiner

*Primary Examiner* — Marivelisse Santiago Cordero
*Assistant Examiner* — Moustapha Diaby
(74) *Attorney, Agent, or Firm* — Fitzpatrick, Cella, Harper & Scinto

(57) ABSTRACT

An information processing apparatus with a printer driver, which generates print data to be output to an image forming apparatus, corresponding to a plurality of image forming apparatuses registers a compound setting that information indicating output destinations corresponding to the plurality of image forming apparatuses and a plurality of print settings are combined, and sets information indicating an output destination included in the compound setting to the printer driver.

6 Claims, 13 Drawing Sheets

FIG. 4

LBPxxx Generic Printer PROPERTY

| GENERAL | COMMON | PORT | DETAILED SETTING | SECURITY | DEVICE SETTING | FAVORITE |

LBPxxx Generic Printer

PRINTING PORT (P)
THE DOCUMENT IS PRINTED AT THE FIRST USABLE PORT,
AMONG THE PORTS WITH CHECKED CHECK-BOXES

| PORT | EXPLANATION | PRINTER |
|---|---|---|
| ☐ IP_aaa.bbb.eee.f | Standard TCP / IP Port | LBPxxxA Generic |
| ☑ IP_aaa.bbb.ccc.d | Standard TCP / IP Port | LBPxxx Generic |
| ☐ IP_aaa.bbb.ggg.h | Standard TCP / IP Port | LBPxxxB Generic |
| ☐ IP_aaa.bbbiii.jjj.f | Standard TCP / IP Port | LBPxxxC Generic |
| ☐ IP_aaa.bbb.kkk.l | Standard TCP / IP Port | LBPxxxD Generic |

[ ADD A PORT (T)... ]  [ DELETE A PORT (D)... ]  [ CONSTRUCTION OF PORT (C)... ]

☑ BIDIRECTIONAL PORT SUPPORT IS ON (E)
☐ PRINTER POOL IS ON (N)

[ OK ]  [ CANCEL ]  [ APPLY (A) ]  [ HELP ]

FIG. 5

LBPxxxx Generic Printer PROPERTY

| GENERAL | COMMON | PORT | DETAILED SETTING | SECURITY | DEVICE SETTING |

TYPES OF DEVICES (V): [A4 MONOCHROME ▼]

NUMBER OF CASSETTES (U): [1 ▼]

☐ SIDE PAPER DECK (K)
☐ DOUBLE-SIDED PRINTING (S)
☐ STAPLING (E)
☐ SADDLE STITCHING (T)
☐ BOX SAVING (O)

INTERNAL SPOOL PROCESS (P): [AUTOMATIC ▼]

☐ USE BRANCH MANAGEMENT FUNCTION (J)    [SETTING (I)...]
☐ SET USER NAME (U)                     [SETTING (W)...]
☐ DESIGNATE BOX NUMBER WHEN SAVING (E)
☐ ALLOW OUTPUT PORT SETTING FOR EACH FAVORITE (N) ~501

[VERSION INFORMATION (B)]

[OK]  [CANCEL]  [APPLY (A)]  [HELP]

FIG. 11

| NAME OF FAVORITE | OUTPUT PORT SETTING FLAG | OUTPUT PORT NAME |
|---|---|---|
| STANDARD SETTING | OFF | |
| DOUBLE SIDE 2 IN 1 | ON | IP_aaa.bbb.eee.fff |
| BOOKBINDING (DRAFT) | ON | IP_aaa.bbb.ccc.ddd |
| BOOKBINDING (FINAL) | ON | IP_aaa.bbb.ggg.hhh |
| HIGH QUALITY COLOR | ON | IP_aaa.bbb.iii.jjj |
| DRAFT | ON | IP_aaa.bbb.eee.fff |

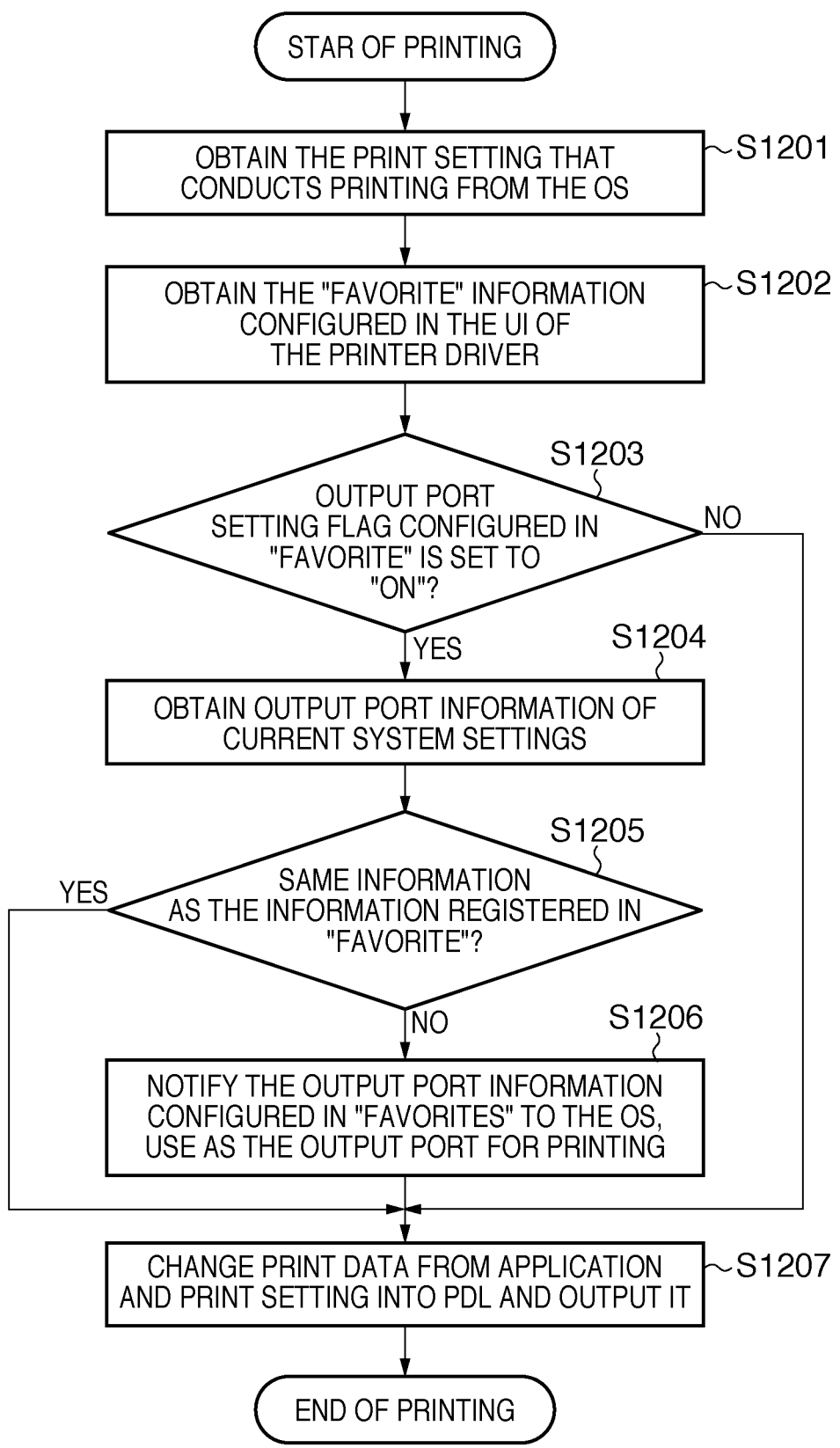

INFORMATION PROCESSING METHOD AND INFORMATION PROCESSING APPARATUS

BACKGROUND OF THE INVENTION

1. Field of the Invention

The present invention relates to an information processing method and an information processing apparatus with a printer driver, which generates print data to be output to an image forming apparatus, corresponding to a plurality of image forming apparatuses.

2. Description of the Related Art

There is software called a printer driver for causing a printing device such as a printer to perform a print process by application software executed on the operating system. The setting of various print modes such as the selection of a paper cassette, the setting of a color processing method and the selection of a discharge method becomes possible with the printer driver.

Generally, the type of a printer driver is unique to a printing device, and a printer driver is provided for each printing device to maximize the performance of the printing device. Further, in a case where a plurality of printing devices are used simultaneously, printer drivers for every printing device have to be installed, or, in a case where the used printer is changed, changing the printer driver is necessary. Therefore, for easy management of a plurality of printing devices, there is a necessity for a printer driver that can mutually control a plurality of printing devices.

If there is such a printer driver, by installing just one printer driver it is possible to conduct printing in a plurality of printing drivers; moreover, the system need not be changed by changing the printing devices; therefore, system management is simplified.

However, in an office environment where multiple printing devices are being used, the printing device used for printing according to the print usage is often changed. As an example, in a case where large number of printing is conducted, the printing device is changed to a fast printing device; in a case where printing drafts, the printing device is changed to a black and white printer; and in a case where important document is printed, the printing device is changed to a high image quality color printer.

In the usual OS, the output port for each printer driver is assigned based on the control of the OS side. Therefore, in a case where the printing device is changed according to the usage, as mentioned above, while conducting the print setting over the printer driver, it is necessary to change the output port assigned to each printer driver at the OS side. In a case where changing this output port is forgotten, the printing might be outputted to an unintended printing device.

By making it possible to register combination of functions of the printing drivers, simplifying of the conduct of the print setting is being proposed (As examples Japanese Patent Laid-Open No. 2000-222159). However, in a case where the printing is needed to be changed according to the purpose, the combination of print setting and print device is needed to be confirmed.

SUMMARY OF THE INVENTION

The present invention provides a method that allows registering a plurality of print settings according to the purpose.

According to one aspect of the present invention, an information processing method of an information processing apparatus with a printer driver corresponding to a plurality of image forming apparatuses, the printer driver generating print data to be output to an image forming apparatus, the method comprising: registering a composite setup that information indicating output destinations corresponding to the plurality of image forming apparatuses and a plurality of print settings are combined; and setting information indicating an output destination included in the composite setup to the printer driver, is provided.

According to another aspect of the present invention, an information processing apparatus with a printer driver corresponding to a plurality of image forming apparatuses, the printer driver generating print data to be output to an image forming apparatus, the information processing apparatus comprising: a registration unit that registers a composite setup that information indicating output destinations corresponding to the plurality of image forming apparatuses and a plurality of print settings are combined; and a setting unit that sets information indicating an output destination included in the composite setup to the printer driver, is provided.

Further features of the present invention will become apparent from the following description of exemplary embodiments (with reference to the attached drawings).

BRIEF DESCRIPTION OF THE DRAWINGS

FIG. 4 is a figure showing an exemplary UI of the port monitor controlled by the OS;

FIG. 5 is a figure showing an exemplary setting UI of a printer property;

FIG. 11 is a figure showing an exemplary management table for managing output port status for each "favorite"; and FIG. 12 is a flowchart showing the process flow of output port setting process when printing is executed in the present embodiment.

DESCRIPTION OF THE EMBODIMENTS

Figure 1:
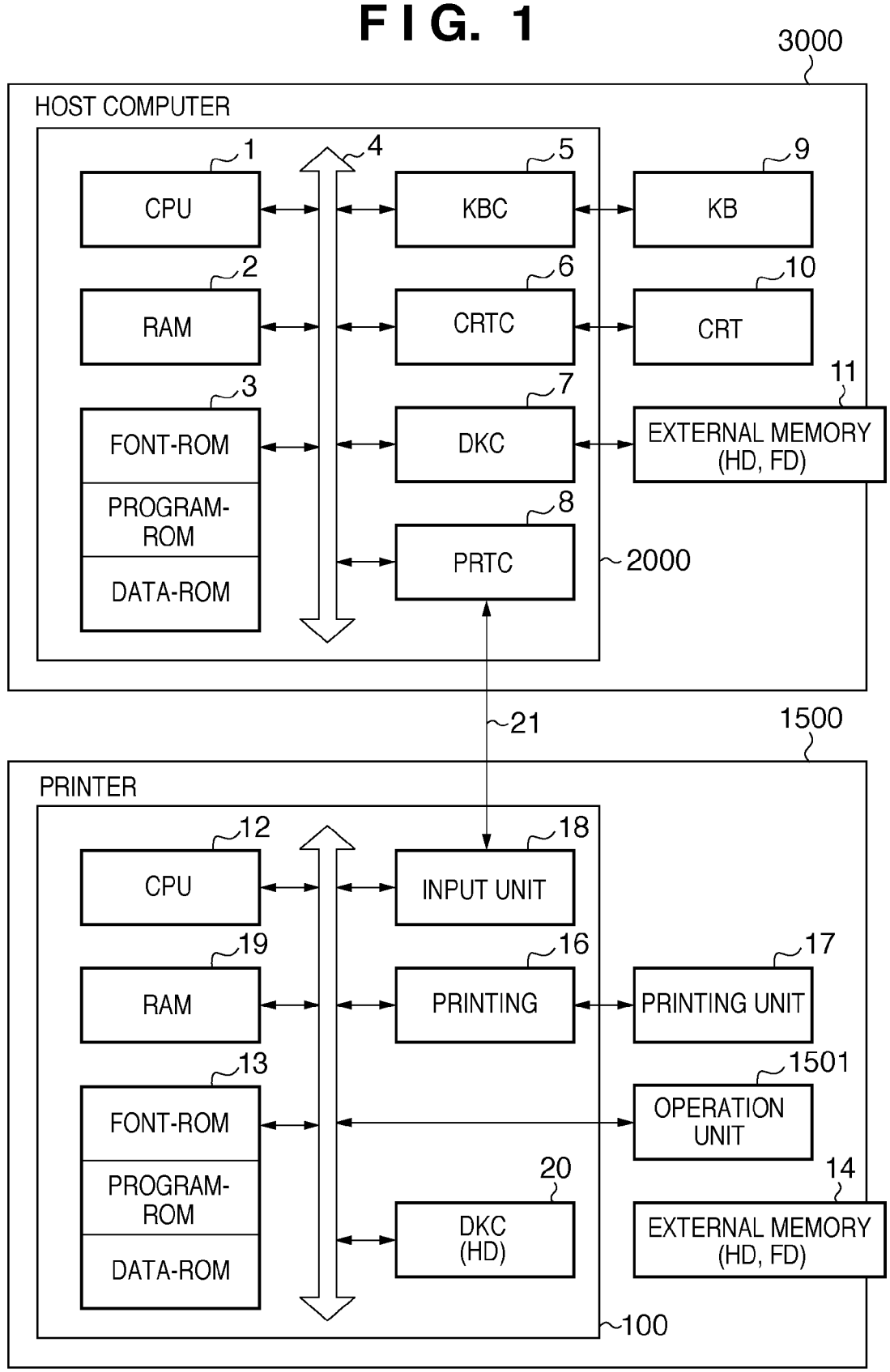
FIG. 1 is a block figure showing an exemplary printing system construction according to the present embodiment.

Hereinafter, while referring to the figures, the preferable embodiment of the present invention is explained in detail. FIG. 1 is a block figure showing an exemplary printing system construction according to the present embodiment. As shown in FIG. 1, the printing system is constructed with a host computer 3000 and a printer 1500. Additionally, the present invention is applicable even in a case where the function of present invention is implemented as a stand-alone device, a system constructed with a multiple devices, or a system that is connected via a network such as a LAN and a WAN and performs processing.

The host computer 3000 shown in FIG. 1 comprises a CPU 1 which conducts document processing with figures, images, characters, charts (including table calculations) and the like, based on a document processing program stored in a program-ROM within a ROM 3 or in an external memory (HD, FD) 11. This CPU 1 controls each device connected to a system bus 4 as a whole.

In the program-ROM within the ROM 3 and in the external memory 11, an operating system (hereinafter: OS) being a controlling program of the CPU 1 and the like are recorded. Moreover, in a font-ROM within the ROM 3 and in the external memory 11, data such as font data for the document processing is recorded; in a data-ROM within the ROM 3 and in the external memory 11, various data for the document processing is recorded. The feed program, each type of application software, font data, user files, editing files, printer control command generating program (hereinafter: printer driver) and the like are being recorded in the external memory 11. Moreover, a RAM 2 functions as main memory of the CPU 1, work area and the like.

Moreover, in the host computer 3000, an input from a keyboard 9 and a pointing device, which is not represented in figure, is controlled by a keyboard controller (KBC) 5. A CRT controller (CRC) 6 controls displaying on a CRT display (CRT) 10. A disk controller (DKC) 7 controls access to the external memory 11 such as a hard disk (HD) and a flexible disk (FD). A printer controller (PRTC) 8 conducts communication of control processes with the printer 1500 which is connected via a bidirectional interface 21.

Additionally, the CPU 1, as an example, executes rasterizing process of outline font to the display information area of the RAM 2, and enables WYSIWYG on the CRT 10. Moreover, based on the command on the CRT 10 provided by a pointing device such as a mouse which is not represented in the figure, and by opening various registered windows, the CPU 1 conducts various processing. Therefore, whenever a user conducts printing, a window concerning print settings of the printer driver opens, and settings of a print processing method including print settings and print mode selection for a printer driver can be performed.

On the other hand, a printer CPU 12 of the printer 1500 outputs an image signal to a printing unit (printer engine) 17 via a printing unit interface 16 based on control programs which are stored in a program-ROM within a ROM 13 and control programs recorded in an external memory 14. In the program-ROM within the ROM 13, the control programs of the CPU 12 and the like are recorded. In a font-ROM within ROM 13, data such as font data used for generating output data is recorded. In the data ROM within the ROM 13, in a case where a printer has no external memory 14 such as a hard disk, information used in the host computer is being recorded.

Moreover, the CPU 12 is configured so that it is able to conduct communications with the host computer 3000 through an input unit 18; therefore, information within the printer 1500 is notified to the host computer 3000. A RAM 19 is a RAM functioning as a main memory, work area and the like of the CPU 12; and it constructed with expendability by an adding optional RAM to an expanding port (not shown in the figure). Additionally, the RAM 19 is used as an output information expansion area, environment data storing area, NVRAM and the like.

Access of an external memory 14 such as the Hard disk (HD) and the IC card, as mentioned above, is controlled by a disk controller (DKC) 20. Moreover, in the external memory 14 connected as an option, data such as font data, emulation programs and form data is recorded. Further, an operation unit 1501 is constructed of such as switch for operations, LED and LCD. Moreover, the printer 1500 may include an NVRAM which is not represented in the figure; then, printer mode setting information from the operation unit 1501 may be recorded.

A printing unit 17 is used as an engine of an electrophotographic method in the present embodiment. However, the printing method of the present invention is not limited to the electrophotographic method. As an example, the present invention can be applied to a printing device with dot forming methods such as an inkjet method.

Next, the construction and execution thereof the print processing executing software modules in the host computer 3000, which is connected to the printer 1500, will be explained using FIG. 2.

Figure 2:
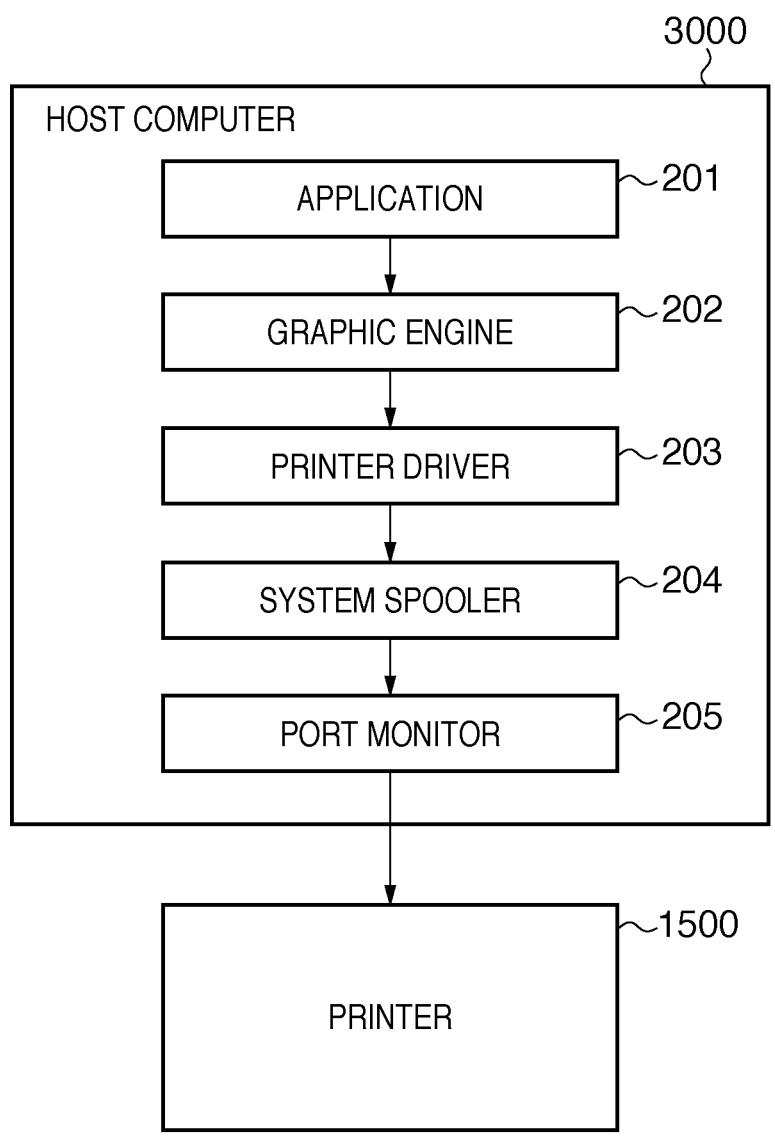
FIG. 2 is a figure showing the software module construction that conducts printing process in host computer 3000.

FIG. 2 is a figure showing the software module construction that conducts the print processing in the host computer 3000. In FIG. 2, an application 201, a graphic engine 202, a printer driver 203, a system spooler 204 and a port monitor 205 exist as files in the external memory 11. Further, every time each module is used, it is loaded into the RAM 2 and executed by the OS. The printer driver 203 includes a module that creates print data that should be sent to the printer. Moreover, the printer driver 203 includes a UI screen for controlling the setting by a user or an administrator, which is discussed later. Moreover, inconsistencies in the print setting are determined, processing for modifying print settings input using the UI or favorites to predetermined print settings is also included in the UI module.

Moreover, the application 201 and the printer driver 203 are able to add FD of the external memory 11 to HD of external memory 11 using a CD-ROM or a network which is not represented in the figure. The application 201 stored in the external memory 11 is executed by loading to the RAM 2. When conducting printing using the printer 1500 from the application 201, the process is similarly loaded into the RAM 2, by using the executable graphic engine 202 outputting (imaging) is executed.

The graphic engine 202 loads the printer driver 203 prepared for each printing device such as printers from the external memory 11 to the RAM 2, and sets an output of the application 201 to the printer driver 203. Moreover, the graphic engine 202 changes the GID (Graphic Device Interface) function received from application 201 to DDI (Device Driver Interface) function, and outputs to the printer driver 203.

The printer driver 203 generates, based on the DDI function received from the graphic engine 202, a control command, as an example PDL (page description language) that the printer could identify. The generated control command is output to the printer 1500 as print data via the system spooler 204 loaded to the RAM 2 by the OS and the interface 21. Here, the system spooler 204 and the port monitor 205 are controlled by the OS.

Figure 3:
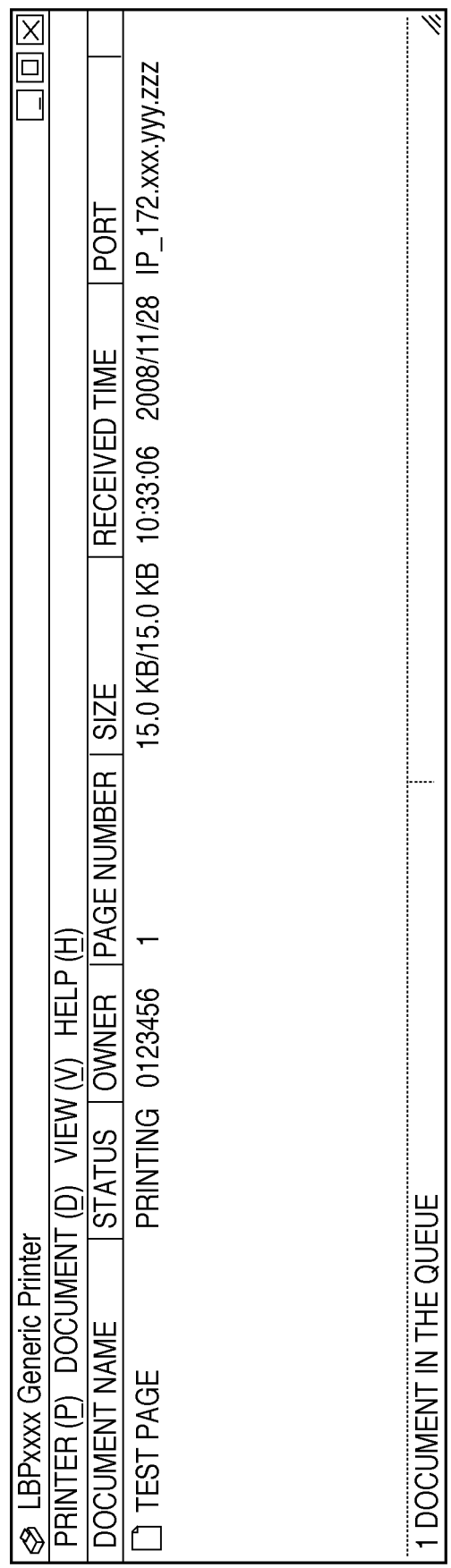
FIG. 3 is a figure showing the user interface (UI) of the system spooler 204 managed by the OS.

FIG. 3 is a figure showing a user interface (UI) of the system spooler 204 managed by the OS. Further, FIG. 4 is a figure showing an exemplary UI of the port monitor 205 controlled by the OS.

FIG. 5 is a figure showing an exemplary device setting UI of a printer property. This UI may be set as a UI of the printer driver 203 only in a case where the administrator allows it. In other words, it may be set as a UI that the printer administrator utilizes to set mounted conditions by setting option such as paper feeding unit and paper discharge unit, printer control method, and the like. The contents set using this UI is applied to controlling of the UI of the printer driver 203, the average uses will commonly use this printer driver 203.

In this UI, a setting 501 defines whether or not it should be allowed to set an output port for every favorite. In a case where the check box is unchecked so that for every "favorite" it is "not allowed" to set an output port, even in a case where an average user who is not the print administrator is selected a composite setup, these values are ignored. As the default value of the printer output destination, a preliminary configured value in the printer driver is used. In other words, it is possible to make output destination unchangeable. Additionally, in printer driver 203, the setting screen (501 of FIG. 5) which is preliminary set by the administrator, when the composite setup is allowed (the check box is ON), the setting is conducted using the output destination given by a "favorite". When the output destination of the "favorite" is not allowed (in case the check box is OFF), the default output is selected.

The "favorite" is a combination of print settings registered in the printer driver 203; it is a function that allows simplifying the print setting process by registering the "favorite" according to the intended purpose. In general, prospective print setting combinations that is assumed to be used is registered. Additionally, according to the management configuration, the printers allowed to be used by the average user is limited, and changing the printers according to the average user's preference is not allowed. In this case, the setting 501 of "for each favorite an output port setting is allowed" is set to off, thereby prohibition of registering the output port into the "favorite" is possible.

Figure 6:
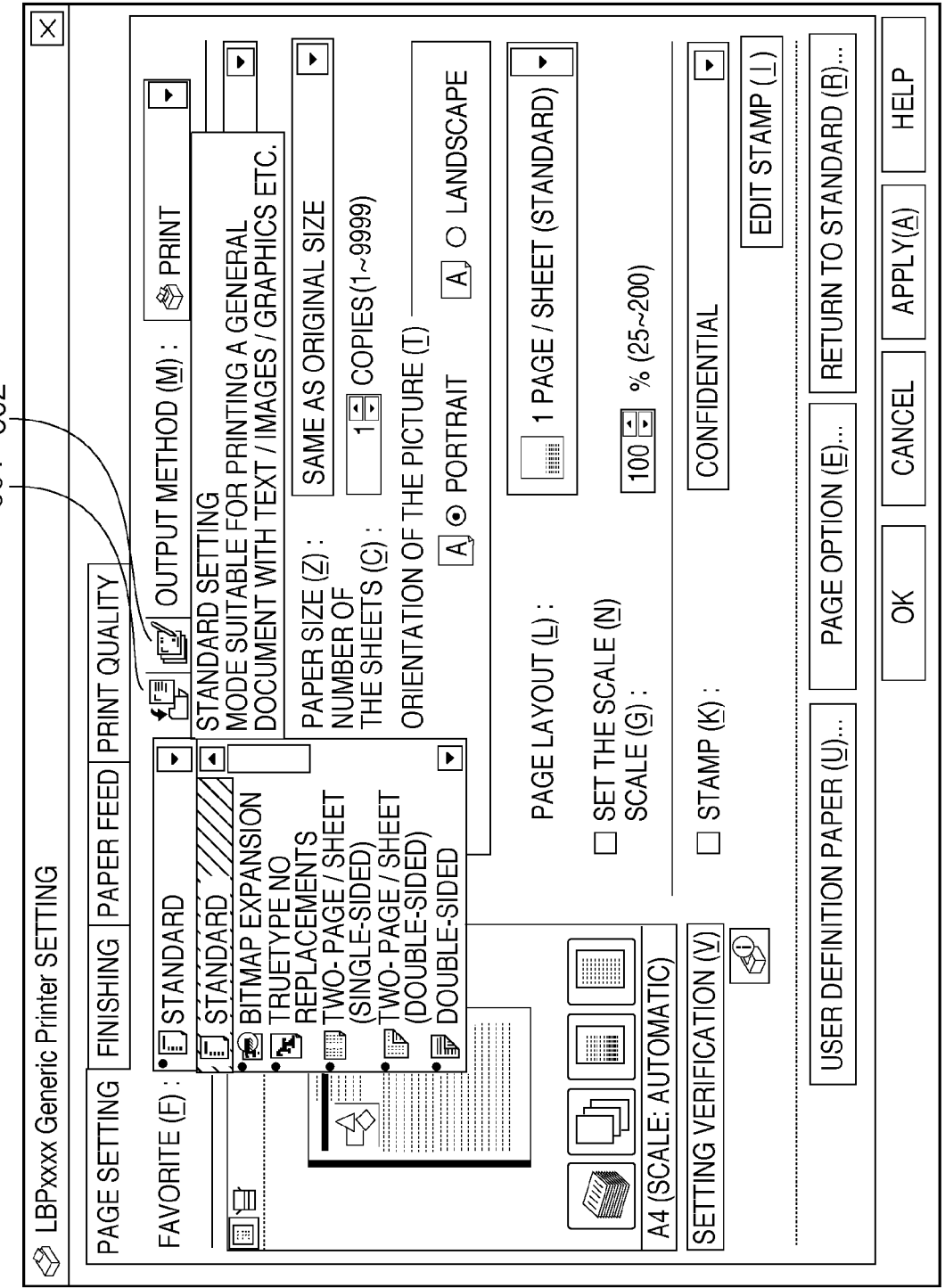
FIG. 6 is a figure showing an exemplary UI of print setting "favorite"
Figure 7:
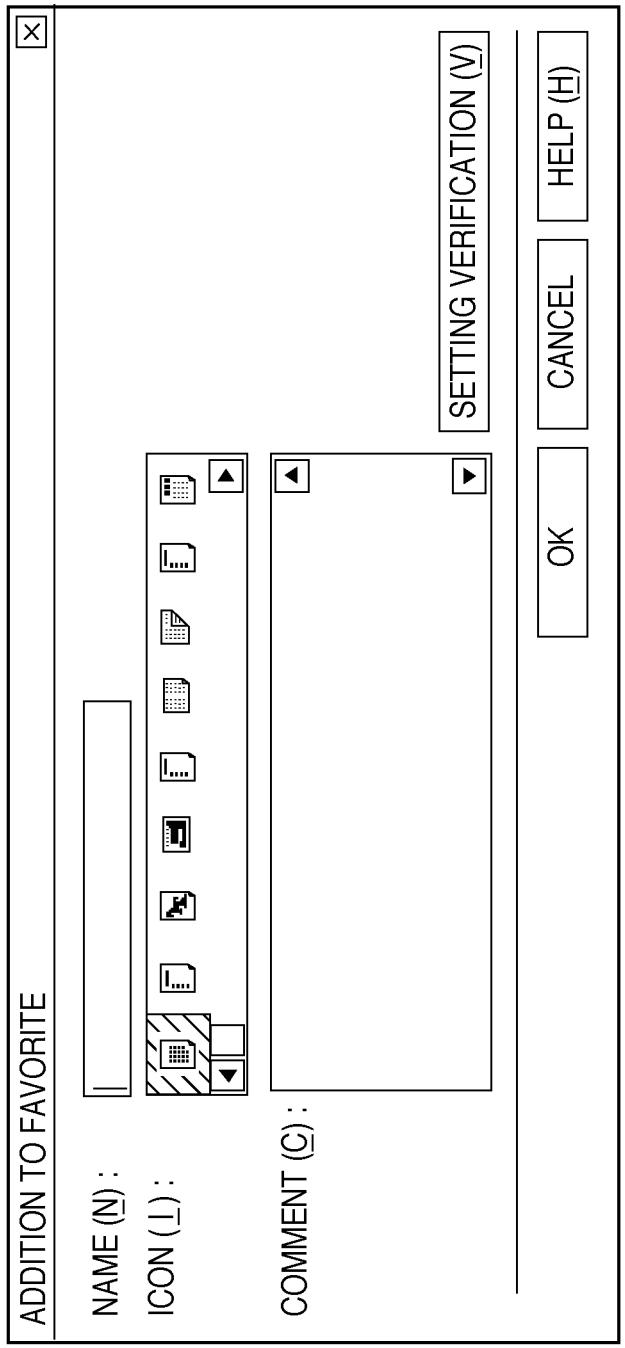
FIG. 7 is a figure showing an exemplary UI for adding to the "favorite"
Figure 8:
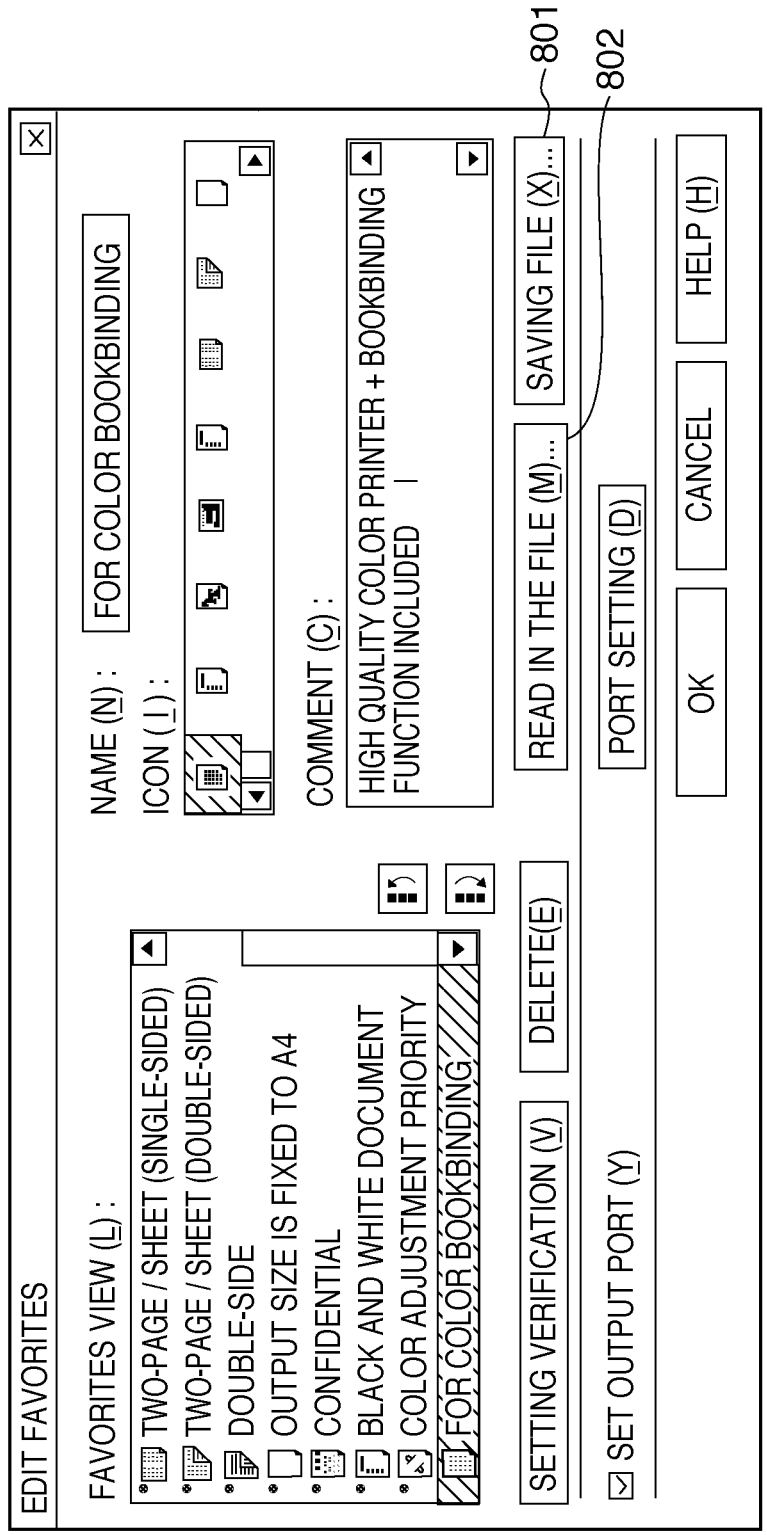
FIG. 8 is a figure showing an exemplary UI for editing of the "favorite"

Here, the "favorite" function of printer driver 203 will be explained using FIGS. 6 to 10. FIG. 6 is a figure showing an exemplary UI of print setting "favorite". By selecting the composite print setting registered as "favorite", the registered print setting is applied as the preset print setting. Here, when add "favorite" button 601 is selected, the UI of FIG. 7 is shown; and when the edit "favorite" button 602 is selected, the UI of FIG. 8 is shown. According to the example shown in FIG. 8, in the favorite synopsis composite setups that combine a plurality of print setting is listed, and the state where one composite setup (in this case "for color bookbinding") is selected as shown.

FIG. 7 is a figure showing an exemplary UI for adding to the "favorite". FIG. 8 is a figure showing an exemplary UI for editing the "favorite". Using this "favorite" editing UI, it is possible to conduct the setting of "set the output port" function and "port setting". Additionally, in FIG. 5, in a case where the setting 501 designating whether or not "an output port setting for each "favorite" is allowed" is set to off, the selection of function "set the output port" and "port setting" are not displayed. Moreover, in a case where the setting 501 is set to on, the selection of function "set the output port" and "port setting" are allowed. Here, when the "set the output port" is not checked, the "port setting" is grayed-out so that it could not be selected; in a case where the "set the output port" is checked, the gray-out representation is canceled and allow user to select the "port setting".

Moreover, in a case where a saving function 801 of the configured "favorite" file is selected, it is possible to make the currently selected "favorite" setting including the configured status of "set output port" and "port setting" to save into a file. Further, in a case where a "favorite" file reading function 802 is selected, "favorite" setting information is extracted from the designated file, and registered as a "favorite" item. In this case, the setting 501 designating whether or not "an output port setting for each "favorite" is allowed" is set to on, including the present settings of the "set output port" and the "port setting", everything considered to be read in. However, when it is off, settings of "set output port", "port setting", is considered to be not read in.

Next, in FIG. 6, in case UI of "favorite" editing button 602 is selected, the output port registering process on the editing UI will be explained in detail using FIGS. 9A and 9B.

Figure 9A:
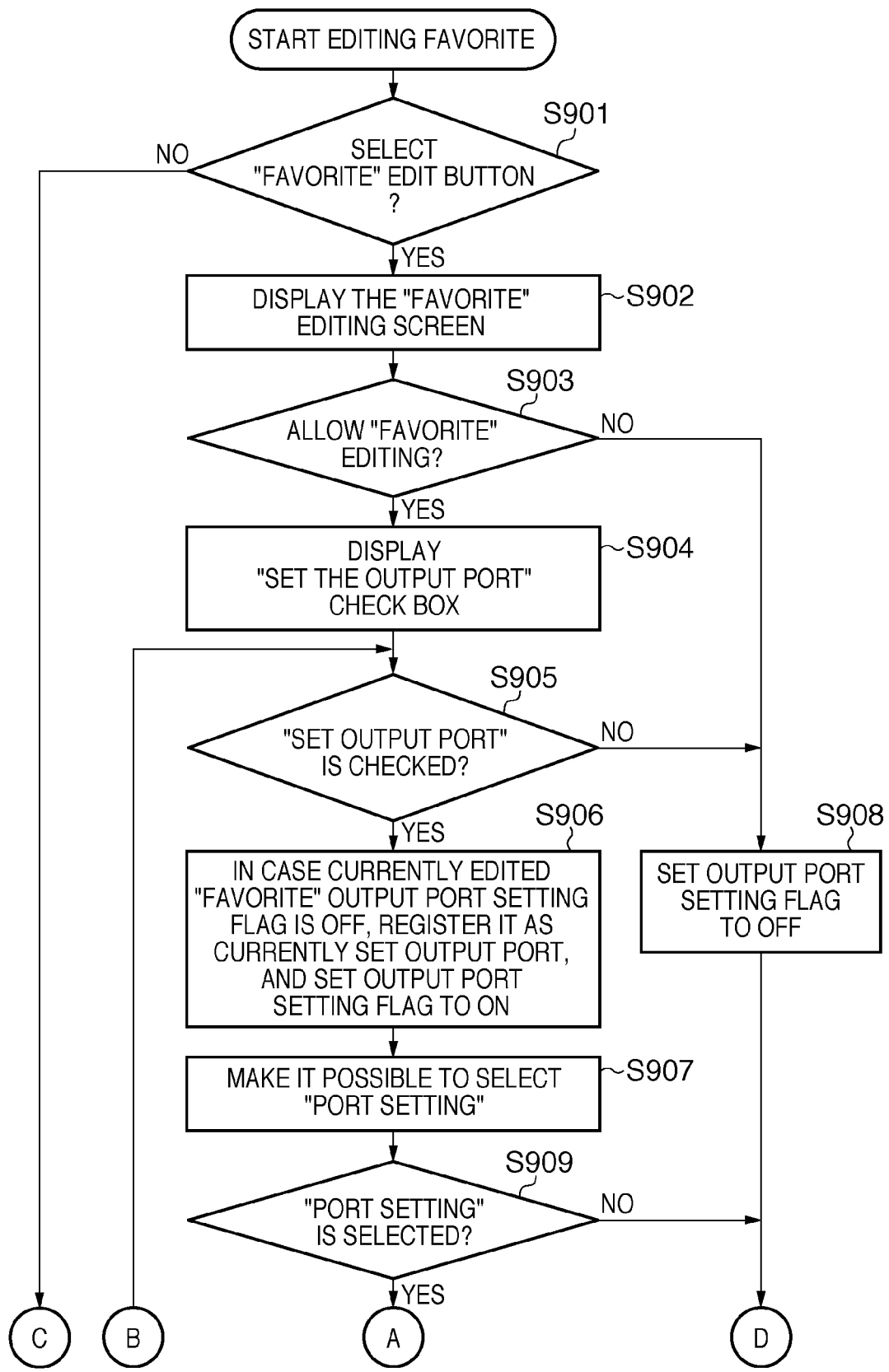
FIGS. 9A and 9B are flowcharts showing the process flow of editing the favorites according to the present embodiment.
Figure 9B:
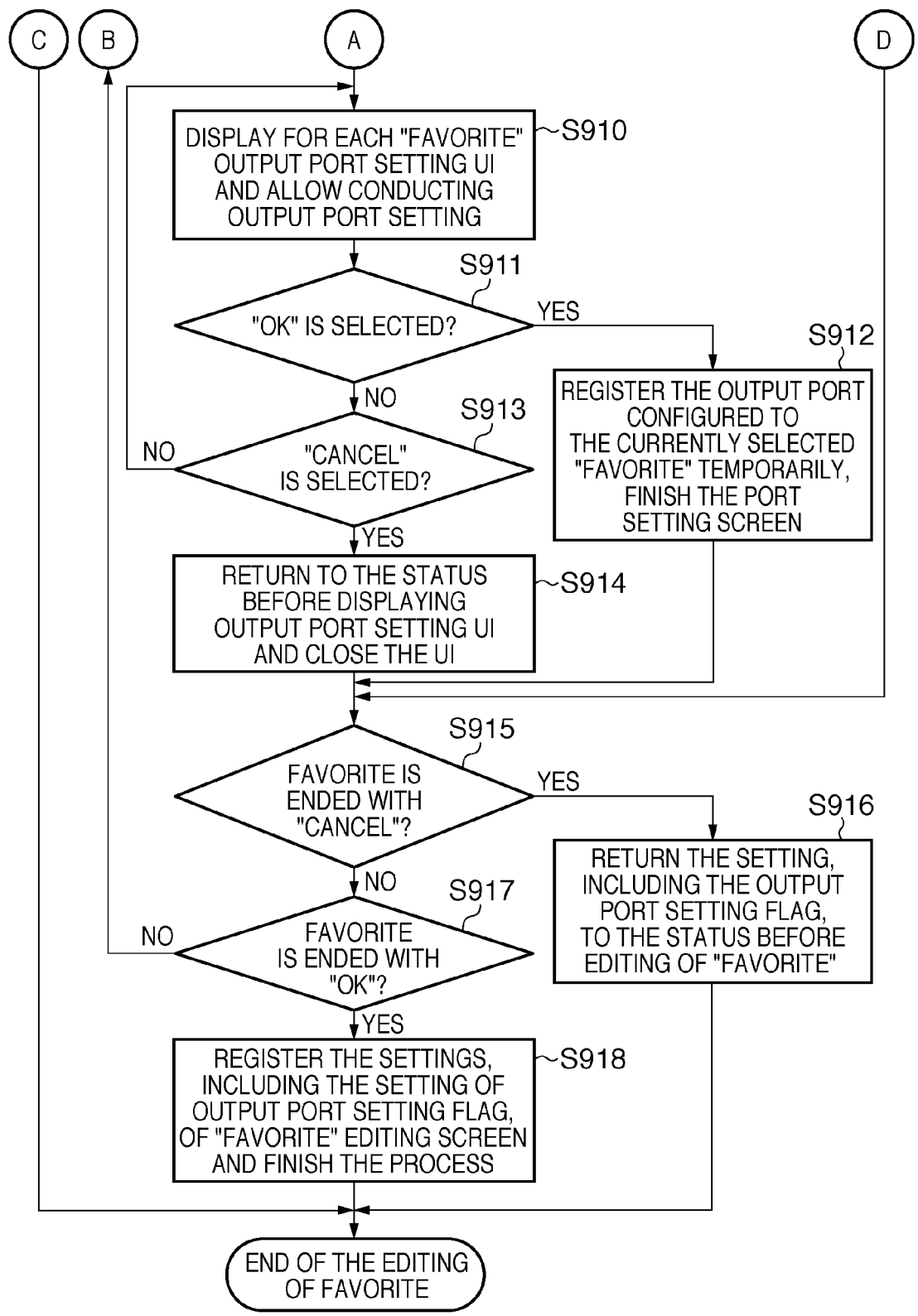

FIGS. 9A and 9B are flowcharts showing the process flow of editing the favorites according to the present embodiment. First in step S901, when "favorite" editing button 602 is selected, the process proceeds to step S902, and represents the UI of FIG. 8. Next in step S903, the "for each "favorite" an output port setting is allowed" or not setting 501 of FIG. 5 is verified. Here, in case it is checked, the process proceeds to the step S904, and to set the output port in UI of FIG. 8, "set the output port" is shown, while graying-out the "port setting".

Next, in step S905, check whether "set the output port" is checked or not, in chase it is not checked the process proceeds to step S908. In this step S908, output setting flag of "favorite" is set to off, and output port setting is also cleared. On one hand, in case it is checked, the process proceeds to step S906, output port setting of currently edited "favorite", in case flag is off, registers the current output port setting contents, and turn the output port setting flag to on. Next, in step S907, the gray-out representation of "port setting" is canceled to make it possible to select "port setting".

Figure 10:
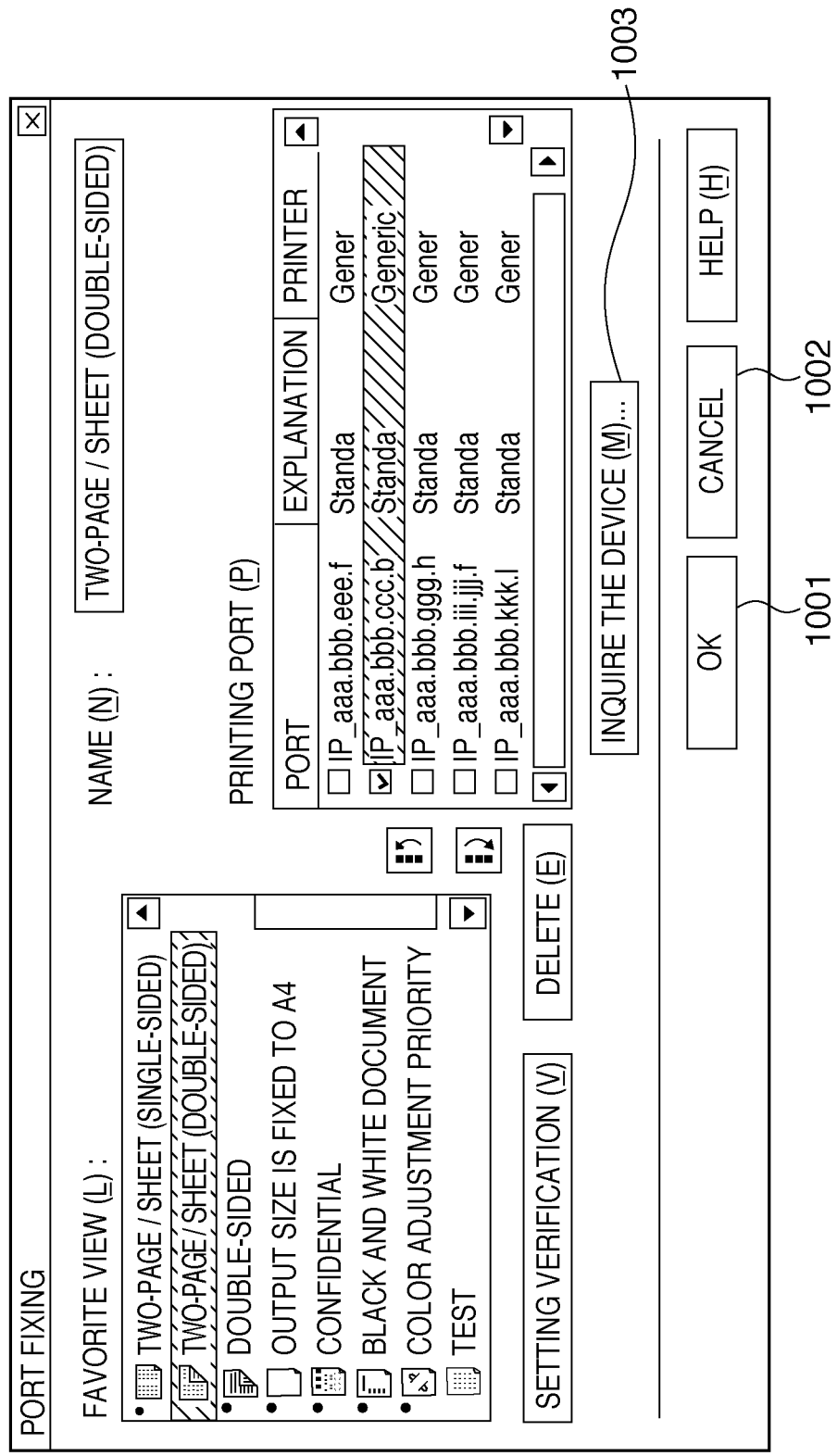
FIG. 10 is a figure showing an exemplary port setting UI according to the "favorite"

Next, in step S909, when "port setting" is selected, process proceeds to step S910, represents the UI of FIG. 10 and enables selecting the output port, then conducts the output port setting. Additionally, FIG. 10 represented in UI, is set such that OS is representing the output ports information managed and represented by itself, it may be possible to represent the information without accessing the OS by directly accessing the IP address, and searching and selecting the networked printers.

Next, in step S911, after output port setting in UI of FIG. 10, when "OK" 1001 is selected, process proceeds to step S912, the selected port is registered with association to the currently edited "favorite". In one hand, in step S913, not "OK" 1001, but "CANCEL" 1002 is selected, process proceeds to step S914, as the status before showing the UI of FIG. 10, the UI of FIG. 10 is closed. Additionally, in the UI of FIG. 10 when "inquire to the device" function 1003 is selected, whether the printer selected is able to conduct the current print setting or not can be verified.

Returning to FIG. 9B, in step S915, whether the "favorite" editing process is completed with "ok", or "cancel" is determined. If the determination result selects "cancel" 1002, the process proceeds to step S916, and returns to the state before "favorite" is edited and finish the process. However, in case "OK" 1001 is selected, process proceeds to step S918, the "favorite" setting contents and output ports are saved, and complete the process.

FIG. 11 is a figure showing an exemplary management table for managing output port status for each "favorite". As shown in FIG. 11, for each name of the favorite, output port setting flag and output port name is managed with association to each other.

Next, according to the print assignments by the applications, when printer driver is executing the printing process, the output port setting process, will be explained using FIG. 12.

FIG. 12 is a flowchart showing the process flow of setting process of the output port when printing is executed in the present embodiment. First, when there is a printing request from application 201, in step S1201, the printer driver 203, via the OS, sets the printing and obtains the print data. Next, in step S1202, the printer driver 203 obtains the "favorite" information selected in the print setting UI. Then, in step S1203, whether the "favorite" output port flag, is on or off is determined; in case it is off process proceeds to step S1207; in case it is on the process proceeds to step S1204.

In step S1204, the currently set output port information of the system is obtained; in step S1205, the process determines whether the output port information set in "favorite" is the same as the currently set output port settings or not. Here, in case it is the same, process proceeds to step S1207, in case it is different the process proceeds to step S1206, this output port information is notified to the OS and sets as the output port that conducts printing.

Next in step S1207, the output port setting is completed, after transforming print date passed on by the application 201 into a format that could be interpret by the printer, it is sent to the printer with printer setting, and printing is conducted.

According to the present embodiment, by first registering the print setting combination in the favorites, at the time printing is conducted, according to the registered favorite, it possible to simplify selecting the printing device and outputting port.

As explained above, a host computer 3000 which is an exemplary information processing device that includes the printer driver which creates the print data that should be output to the printer according to the print assignments given by an application is disclosed. The printer is an exemplary image generating apparatus, and it includes facsimile. Further, scanner and printer composite devices are also included.

The port information, which is exemplary information of which indicates the output destination that corresponds to a printer, is saved in the printer driver (UI module), as a combination of multiple print settings of the favorite. Then, the printer corresponds to the port information included in the favorite, is configured as the printer that should be the destination to the output print data.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-035817, filed Feb. 18, 2009 which is hereby incorporated by reference herein in its entirety.

What is claimed is:

1. An information processing method in an information processing apparatus for outputting print data to one of a plurality of image forming apparatuses in accordance with a print instruction from application software, the method comprising:

setting, when a combination of a plurality of print settings for the print data is registered, information indicating an output destination corresponding to one of the plurality of image forming apparatuses as a composite setup including the combination of the plurality of print settings;

controlling the information processing apparatus such that the print data is output to an image forming apparatus corresponding to the output destination indicated by the information set as the composite setup, in a case that the composite setup is designated by a user upon the print instruction; and notifying, as a function of a device driver for the image forming apparatus, an operating system of the information processing apparatus of the information indicating the output destination set as the composite setup so that the print data is output to the image forming apparatus corresponding to the output destination indicated by the information indicating the output destination set as the composite setup, in a case that the composite setup is designated by the user and the information indicating the output destination set as the composite setup is different from information indicating an output destination set by the operating system, wherein, according to the notification, the information indicating the output destination set by the operating system is updated.

2. The method according to claim 1, wherein the setting of the information indicating the output destination set as the composite setup is performed by a selection via a first screen displaying a list of a plurality of output destinations corresponding to the plurality of image forming apparatuses.

3. The method according to claim 2, wherein the first screen includes an instruction function for inquiring whether or not the combination of the plurality of print settings included in the composite setup is executable to an image forming apparatus corresponding to the selected output destination.

4. The method according to claim 1, further comprising displaying a second screen for setting whether to allow a user to set the information indicating the output destination set as the composite setup.

5. An information processing apparatus for outputting print data to one of a plurality of image forming apparatuses in accordance with a print instruction from application software, the information processing apparatus comprising:

a setting unit configured to set, when a combination of a plurality of print settings for the print data is registered, information indicating an output destination corresponding to one of the plurality of image forming apparatuses as a composite setup including the combination of the plurality of print settings;

a control unit configured to control the information processing apparatus such that the print data is output to an image forming apparatus corresponding to the output destination indicated by the information set as the composite setup, in a case that the composite setup is designated by a user upon the print instruction; and a notification unit configured to notify, as a function of a device driver for the image forming apparatus, an operating system of the information processing apparatus of the information indicating the output destination set as the composite setup so that the print data is output to the image forming apparatus corresponding to the output destination indicated by the information indicating the output destination set as the composite setup, in a case that the composite setup is designated by the user and the information indicating the output destination set as the composite setup is different from information indicating an output destination set by the operating system, wherein, according to the notification, the information indicating the output destination set by the operating system is updated.

6. A non-transitory computer-readable recording medium recording a program for causing a computer to execute the information processing method according to claim 1.

* * * * *